Oct. 8, 1940.　　　　G. H. SEBADE　　　2,216,790
POWER MOWING MACHINE
Filed Sept. 20, 1939

INVENTOR.
Geo. H. Sebade
BY A. E. Fisher
ATTORNEY

Patented Oct. 8, 1940

2,216,790

UNITED STATES PATENT OFFICE 2,216,790

POWER MOWING MACHINE

George H. Sebade, Deer River, Minn.

Application September 20, 1939, Serial No. 295,711

2 Claims. (Cl. 56—303)

This invention relates to improvements on power mowing machines, and the main object is to provide a form of sickle bar and assembly for mowers, adapted for removably mounting in the guide-way of the mower head, so that it may be readily taken off for sharpening or repair.

Another object of the invention is to provide in combination with a power driven mowing machine, having a sickle head and sickle bar or blade reciprocably mounted therein, and having a pitman rod and connections for communicating power to the blade or bar, means for quickly removing the sickle bar from its assembly on the mower, for sharpening, replacement or repair.

A preferred embodiment of the invention is shown in the drawing, wherein.

Figure 1:
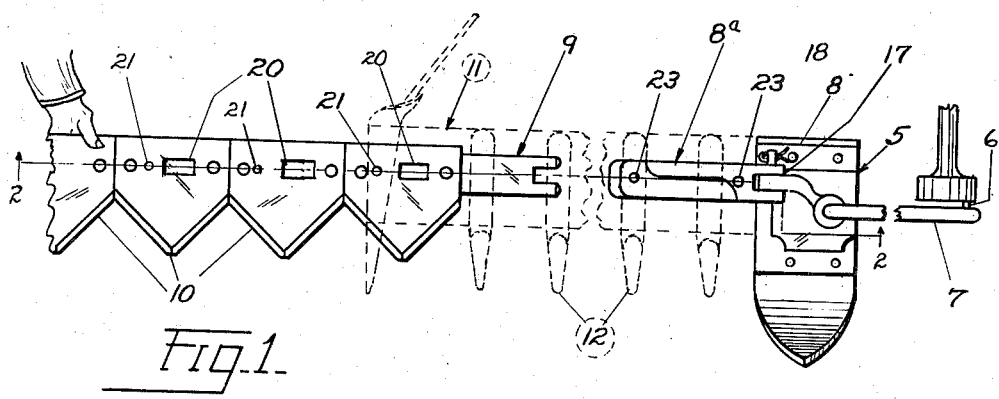
Figure 1 is a plan view showing a sickle bar or blade in process of assembling upon the pitman crank of a mowing machine by means of connecting parts embodying my invention.
Figure 2:
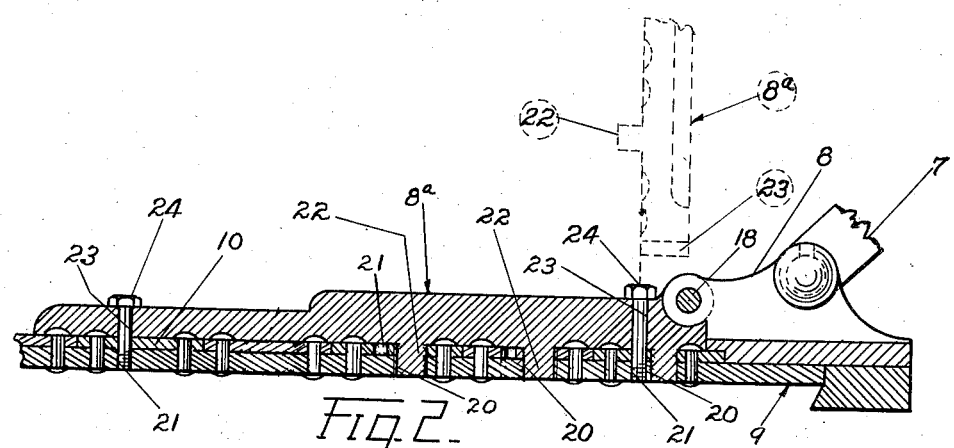
Figure 2 is an enlarged longitudinal vertical section on the line 2—2, after the parts are completely united, the method of detaching the sickle head from the bar being shown in dotted lines.
Figure 3:
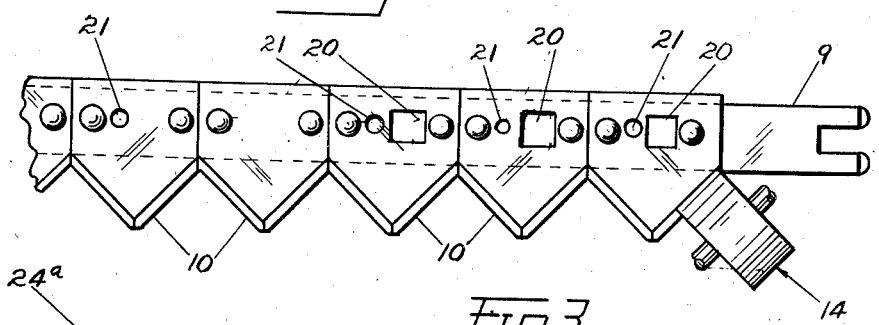
Figure 3 is an enlarged plan view of the inner end of a sickle bar and attached cutter sections, as removed from the sickle head and showing the convenience in sharpening afforded by this invention.
Figure 4:
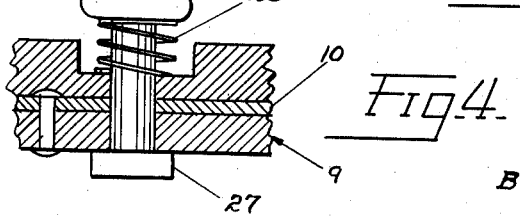
Figure 4 is an enlarged sectional detail of a spring set form of push-bolt usable in lieu of a simple threaded bolt for securing the sickle head to the sickle bar.

This invention is designed for application to any conventional power mower 5 having a pitman crank 6 journaled in the inner end of the pitman rod 7. Conventionally the outer end of the rod 7 is removably connected to a one piece sickle head 8 permanently anchored to the inner end of the sickle bar 9 carrying the triangular cutter sections 10 riveted thereto and reciprocably mounted in the mower head 11 carrying the spaced guards 12.

In sharpening the cutter segments of such assembly, the sickle bar and head were drawn out together and the segments successively positioned to the grind-stone 14. But owing to the bulk and weight of the permanently mounted sickle head, it was difficult or impossible to so sharpen the three or four cutter segments or sections immediately next the sickle head.

In accordance with my invention, I provide a two-part sickle head 8—8a hingedly connected by means of a dove-tail joint 17 bored through transversely and horizontally for the reception of a bolt 18 passed through the overlapped webs or dove-tails of the joint. Thus the part 8a may be tilted upward relative to the part 8. The part 8 is operatively connected with the pitman rod 7 similarly to the conventional arrangement.

In accordance with the invention, the sickle-bar 9 and attached sections 10 are formed with a number of aligned slots or sockets 20 and also with a number of threaded bolt holes 21. The outer part of the sickle head 8a is then formed with lock lugs 22 projecting from its under side and aligned with and adapted snugly to fit into the sockets 20 of the sickle bar when the elements are properly assembled, and the part 8a is turned down upon the sickle bar for making the connection.

Similarly a number of bolt holes 23 are formed through the part 8a adapted also to align with the threaded holes 21 of the sickle bar. Bolts 24 are then passed down through the holes 23 and turned tightly down into the threaded holes 21, whereby the part 8a of the sickle head is firmly yet removably mounted to the bar 9.

In lieu of the rigid connection between part 8a of the sickle head and the sickle bar 9, a more resilient conection may be provided through use of the spring-set bolts 24a, having the coil springs 26 set beneath their heads, and having nuts 27 threaded on their under or lower ends. Such flexible or resilient connection is sometimes of advantage on rough land.

In use and when it is desired to sharpen the sickle sections, the bolt 18 is easily removed and the bar 9 then withdrawn endwise from the mower head. The sections 10 may then be readily sharpened by application to the grind-stone 14.

While I have here shown and described a certain embodiment of my invention and certain structural features thereof, any desired changes therein may be made, within the scope of the claims.

I claim:

1. In a mower assembly embodying a mower head and sickle bar reciprocably and removably mounted therein, the sickle bar carrying cutter sections thereon, the bar and attached cutter sections being formed at the inner end with spaced lug sockets and spaced bolt holes,—a two-part sickle head, the parts being super-posed and hingedly connected at their inner ends for relative vertical movement, the lower part being anchored to the inner end of the sickle bar and the upper part formed with lugs at its under side seated in the sockets of the sickle bar, and with bolt holes aligned with the bolt holes of said bar, and bolts seated through said aligned bolt holes.

2. In an assembly according to claim 1, coil springs seated beneath said bolt heads for providing a somewhat yieldable joint.

GEORGE H. SEBADE.